United States Patent
Soda et al.

(10) Patent No.: US 6,704,174 B2
(45) Date of Patent: Mar. 9, 2004

(54) MAGNETIC RECORDING AND PLAYBACK DEVICE WITH ESD PROTECTION

(75) Inventors: Yutaka Soda, Kanagawa (JP); Nobuyuki Nagai, Miyagi (JP); Katsuhiro Kasuga, Kanagawa (JP); Hiroshi Meguro, Miyagi (JP); Tadashi Ozue, Kanagawa (JP)

(73) Assignee: Sony Corporation (JP)

( * ) Notice: Subject to any disclaimer, the term of this patent is extended or adjusted under 35 U.S.C. 154(b) by 117 days.

(21) Appl. No.: 10/013,859

(22) Filed: Dec. 13, 2001

(65) Prior Publication Data
US 2002/0089780 A1 Jul. 11, 2002

(30) Foreign Application Priority Data

Dec. 15, 2000 (JP) .................................... P2000-381721
Dec. 26, 2000 (JP) .................................... P2000-394507

(51) Int. Cl.$^7$ ................................................ G11B 5/39
(52) U.S. Cl. ...................................... 360/323; 360/281.6
(58) Field of Search .............................. 360/323, 281.6, 360/320

(56) References Cited

U.S. PATENT DOCUMENTS

| | | | | |
|---|---|---|---|---|
| 5,465,186 A | * | 11/1995 | Bajorek et al. | ............. 360/323 |
| 5,761,009 A | * | 6/1998 | Hughbanks et al. | ........ 360/323 |
| 6,046,890 A | * | 4/2000 | Yamada et al. | ............. 360/323 |
| 6,246,553 B1 | * | 6/2001 | Biskeborn | .................... 360/323 |
| 6,331,924 B1 | * | 12/2001 | Takada | ........................ 360/323 |
| 6,415,500 B1 | * | 7/2002 | Han et al. | ................. 29/603.14 |
| 6,507,466 B1 | * | 1/2003 | Hayashi et al. | ............. 360/323 |

* cited by examiner

Primary Examiner—Brian E. Miller
(74) Attorney, Agent, or Firm—Rader, Fishman & Grauer PLLC; Ronald P. Kananen

(57) ABSTRACT

A head substrate and a projection substrate of a head drum comprise a conductive material having a resistance of $1\times10^{10}\Omega$ or less and are connected to a metal base so as to be at the ground potential via the metal base and a rotating drum. These antistatic treatments allow static electricity charged on a magnetic tape to be discharged to the head substrate and the protection substrate without flowing to a magneto-resistive (MR) element, thereby preventing the electrostatic discharge breakdown of the MR element.

5 Claims, 11 Drawing Sheets

FIG. 3
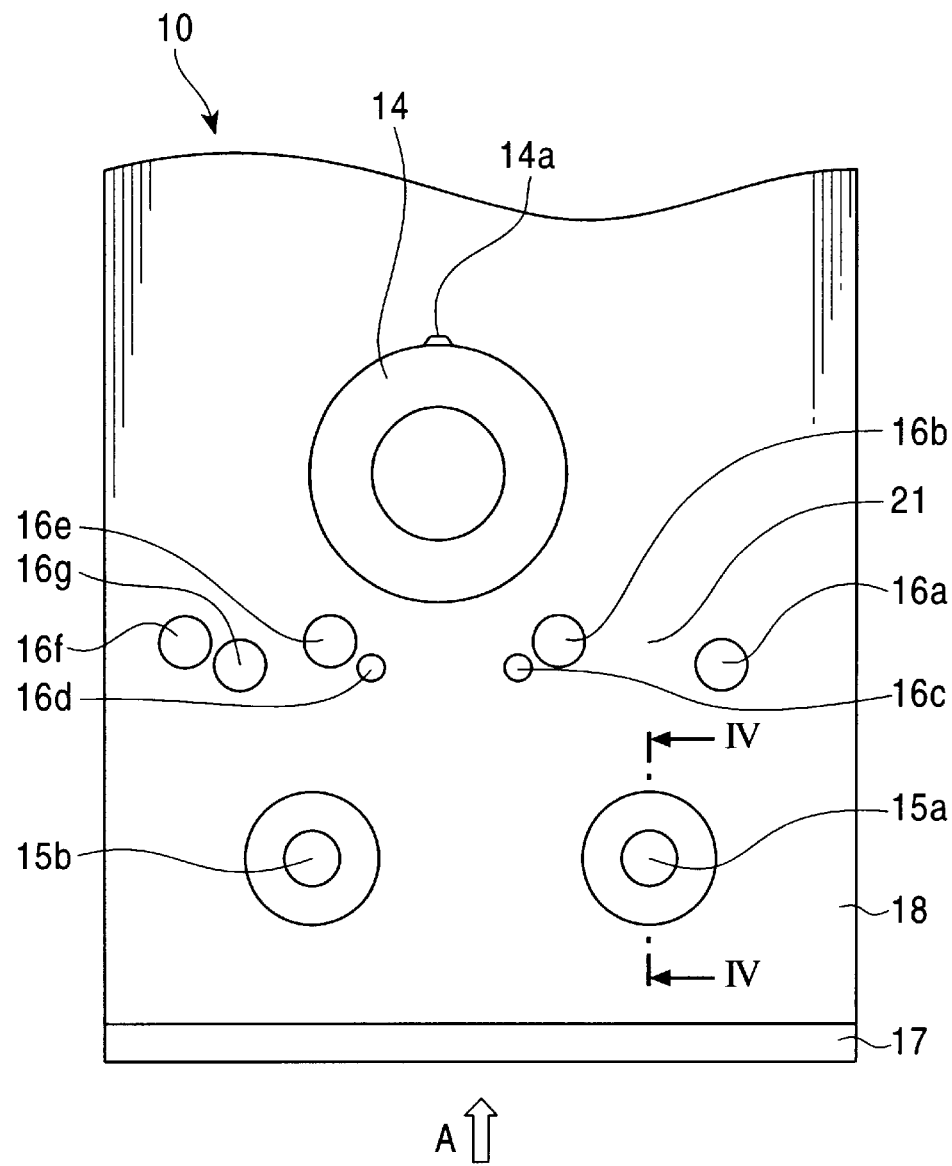
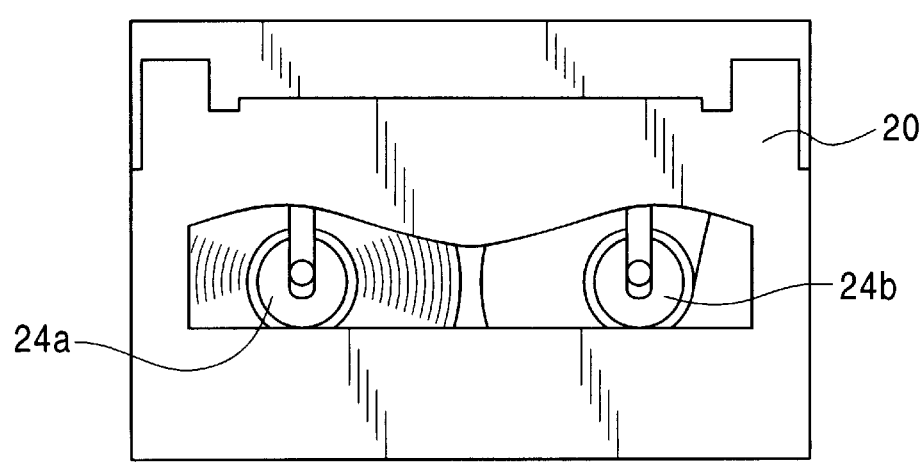

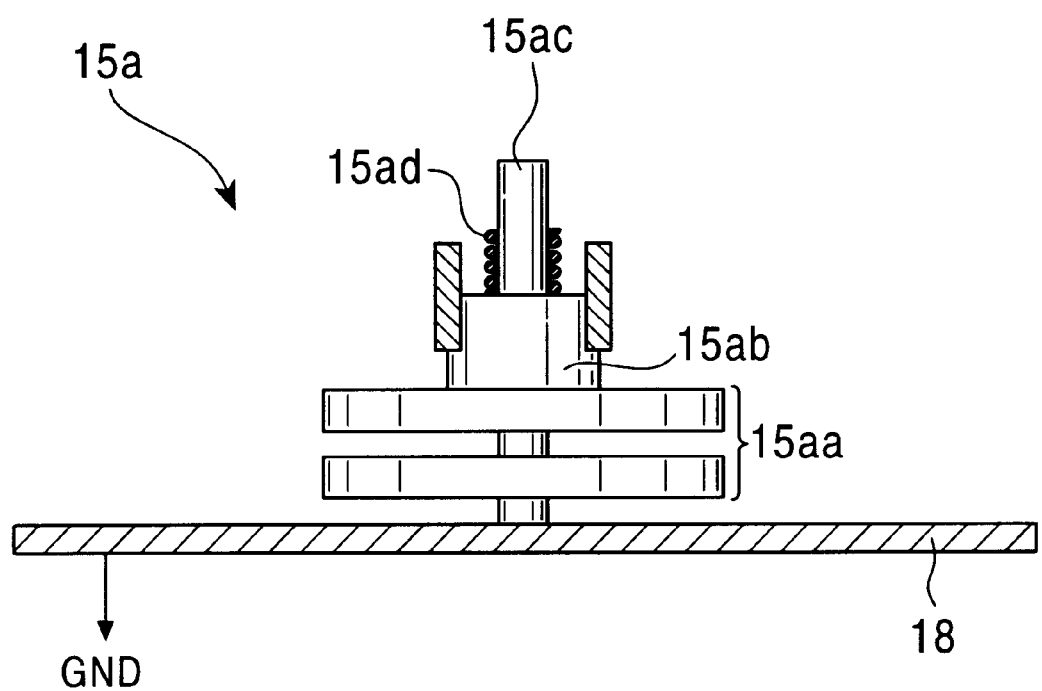

MAGNETIC RECORDING AND PLAYBACK DEVICE WITH ESD PROTECTION

BACKGROUND OF THE INVENTION

1. Field of the Invention

The present invention relates to magnetic storage media from and to which information is read and written and magnetic recording and playback devices for reading and writing information. More particularly, the present invention relates to a magnetic storage medium from and to which information is read and written by using a magneto-resistive head and also to a magnetic recording and playback device, having the magneto-resistive head, for reading and writing information.

2. Description of the Related Art

As the volume of information to be processed in a magnetic recording and playback device, which records and reads data by using a magnetic tape, has been increasing recently, the magnetic tape is required to have a larger storage density. Accordingly, a magneto-resistive head (hereinafter, referred to as an MR head) is essential as a magnetic head for reading signals instead of a conventional inductive head. Because the MR head is one type of magnetic head for reading signals stored in a magnetic storage medium by using a magneto-resistive effect (hereinafter, referred to as an MR effect) of a magneto-resistive element (hereinafter, referred to as an MR element), the MR head is highly capable of detecting signals for providing large reading outputs, thereby allowing the magnetic tape to easily have a reduced recording track-width and an increased recording density in a line direction. This allows the magnetic recording and playback device to perform recording and reading data densely.

Also, a known recording and playback device using a magnetic tape is based on a helical-scan principal arranged such that the magnetic tape for recording and reading signals is wound in a helical manner around a head drum, which is rotatable together with the magnetic head mounted on the rim thereof. In the helical scan-type recording and playback device, the magnetic head records and reads signals while sliding on the running magnetic tape at a high speed, that is, the magnetic tape and the magnetic head have a high relative sliding speed, thereby realizing an improved data transfer rate.

In general, however, the MR head is more sensitive to static electricity and heat than the inductive head. FIGS. 1A and 1B show measured values of an electrostatic-discharge breakdown voltage (hereinafter, referred to as an ESD breakdown voltage) of an anisotropic magneto-resistive head (hereinafter, referred to as an AMR head) and a giant magneto-resistive head (hereinafter, referred to as a GMR head), respectively.

To obtain the values of EDS breakdown voltage, a human body model is used in which the voltage and the resistance across the MR heads, i.e., the AMR head and the GMR head, are measured as shown in FIGS. 1A and 1B for every time when charges stored in a capacitor having a capacitance of 100 pF are discharged while the capacitor is connected to a resistor having a resistance of 1.5 k$\Omega$. The graphs indicate that the EDS breakdown voltages of the AMR head and the GMR are about 230 to 240 V and about 30 to 40 V, respectively. In the meantime, as will be described next, friction, contact, induction, or the like causes a charged insulator, such as plastic including nylon and vinyl in a normal condition, to easily have a voltage of higher than several kV, which far exceeds the EDS breakdown voltages of the MR heads.

Many known cassette cases for winding and housing a magnetic tape are formed of high-resistance synthetic resin materials. These cassette cases are likely charged with static electricity due to friction with, e.g., a packing material, a glove made of synthetic fiber when handled by users a component of the magnetic recording and playback device when loaded in the device. The electrification voltage of a charged synthetic material, such as ABS resin having a surface-resistance of about $1 \times 10^{16}$ $\Omega$/inch$^2$ used for the cassette cases, is 1500 to 2000 V or higher, and the half-life of the voltage is at least three minutes. Since the electrification voltage exceeds far beyond the withstand voltage of the MR head and, further, the half life is long, the electrostatic charges once generated take a long period of time to decay. Therefore, when the charged cassette case is loaded in the magnetic recording and playback device and the magnetic tape therein contacts the MR head, a large amount of current flows into the MR head through the magnetic tape, possibly causing the ESD breakdown of the MR head.

FIG. 2 is a conceptual illustration of a charge flow when the magnetic tape contacts the MR head. A head drum 80 mounted in the magnetic recording and playback device comprises a rotating drum 82 having the magnetic head, e.g., on the rim thereof, and a fixed drum (not shown). A magnetic tape 92 travels around the head drum 80 in a helical manner, and the rotating drum 82 rotates. This rotation allows the magnetic head to scan the magnetic tape 92 so as to record and read signals. FIG. 2 illustrates a part of the head drum 80 in an enlarged scale, and an MR head 81 mounted on the rotating drum 82 as a magnetic head for recording and reading signals detects stored signals in contact with the traveling magnetic tape 92.

When the cassette case for winding and housing the magnetic tape 92 is charged with static electricity, electric charges 83 start to flow from the surface of the magnetic tape 92 to the ground of the head drum 80 through the contacted MR head 81. For example, at the time of starting the reading operation of the magnetic recording and playback device, the cassette case is loaded in the device, and then the magnetic tape 92 comes close to the rotating drum 82 in accordance with the movement of a guide mechanism of the device. At the instant of the magnetic tape 92 contacting the MR head 81, a large amount of electric current flows to an MR element, causing the ESD breakdown of the MR element, and thereby resulting in the failure of reading signals in the magnetic tape 92. With this, the MR head 81 has not been available as a magnetic head of the recording and playback device using the magnetic tape 92.

SUMMARY OF THE INVENTION

The present invention is made in view of the above problems. Accordingly, it is an object of the present invention to provide a magnetic storage medium and a magnetic recording and playback device which prevent the ESD breakdown to an MR head.

To this end, in accordance with one aspect of the present invention, there is provided a magnetic storage medium from and to which information is read and written by an MR head. The magnetic storage medium comprises a magnetic tape and a pair of reels for winding and rewinding the magnetic tape, wherein the reels are provided with an antistatic treatment.

The antistatic treatment performed on the reels suppresses the generation of static electricity to the reels, thereby preventing the ESD breakdown of the MR head. Further, the reels of the magnetic storage medium according to the present invention preferably may comprise a conductive material as the antistatic treatment.

Further, the reels of the magnetic storage medium according to the present invention are preferably connected to the ground when the magnetic storage medium is loaded in a magnetic recording and playback device. Further, the surface-resistance of the conductive material for the reels of the magnetic storage medium according to the present invention preferably ranges from 0 $\Omega$/inch$^2$ to $1\times10^{12}$ $\Omega$/inch$^2$.

In accordance with another aspect of the present invention, there is provided a magnetic recording and playback device. The device comprises an MR head and a pair of reel supports for supporting a pair of reels of a magnetic storage medium loaded in the device, wherein the reel supports are provided with an antistatic treatment.

The antistatic treatment performed on the reel supports for supporting the reels of the magnetic storage medium loaded in the device suppresses the generation of static electricity to the reel supports and, thereby, prevents the ESD breakdown of the MR head. Further, at least one part of the reel supports of the magnetic recording and playback device according to the present invention may comprise a conductive material as the antistatic treatment.

Further, at least one part of the reel supports of the magnetic recording and playback device according to the present invention is preferably connected to the ground. Further, the surface-resistance of the conductive material for at least one part of the reel supports of the magnetic recording and playback device according to the present invention preferably ranges from 0 $\Omega$/inch$^2$ to $1\times10^{12}$ $\Omega$/inch$^2$.

Further, in accordance with still another aspect of the present invention, there is provided a head drum for reading and writing information from and to a magnetic tap. The head drum comprises a conductive rotating drum at the ground potential, around which the magnetic tape is wound in a helical manner, a metal base fixed inside the rotating drum and electrically connected to the rotating drum, and a magnetic head fixed to the metal base. The magnetic head comprises the following components: a head substrate and a protection substrate, both having a resistance of $1\times10^{10}\Omega$ or less and electrically connected to the metal base; a pair of outer insulating films disposed between the head substrate and the protection substrate; a pair of magnetic shielding films disposed between the pair of outer insulating films; a pair of inner insulating films disposed between the pair of magnetic shielding films; and an MR head element for reading stored signals by contacting the magnetic tape disposed between the pair of inner insulating films.

The head substrate and the protection substrate of the head drum may comprise a conductive material having a resistance of $1\times10^{10}$ $\Omega$ or less and may be electrically connected to the metal base so as to be at the ground potential via the metal base and the rotating drum. This treatment allows static electricity charged on the magnetic tape to be discharged to the head substrate and the protection substrate without flowing to the MR element, thereby preventing the ESD breakdown of the MR element.

As described above, the reels of the magnetic storage medium of the present invention are provided with an antistatic treatment, thereby suppressing the generation of static electricity during loading or operating the magnetic storage medium and preventing the ESD breakdown of the MR head.

Further, the reel supports of the magnetic recording and playback device of the present invention are provided with an antistatic treatment, thereby suppressing the generation of static electricity during loading or operating the magnetic storage medium and preventing the ESD breakdown of the MR head.

Still further, the head substrate and the protection substrate of the head drum of the magnetic recording and playback device according to the present invention comprise a conductive material having a resistance of $1\times10^{10}\Omega$ or less, and they are electrically connected to the metal base so as to be at the ground potential via the metal base and the rotating drum. This treatment allows static electricity charged on the magnetic tape to be discharged to the head substrate and the protection substrate without flowing to the MR head, thereby preventing the ESD breakdown of the MR head.

BRIEF DESCRIPTION OF THE DRAWINGS

FIG. 3 is a plan view of an exemplary magnetic tape drive as a magnetic recording and playback device and an exemplary magnetic cassette tape as a magnetic storage medium according to a first embodiment of the present invention;

FIG. 4 is a sectional view of a reel support taken along the line IV—IV indicated in FIG. 3;

DESCRIPTION OF THE PREFERRED EMBODIMENTS

Figure 1A:
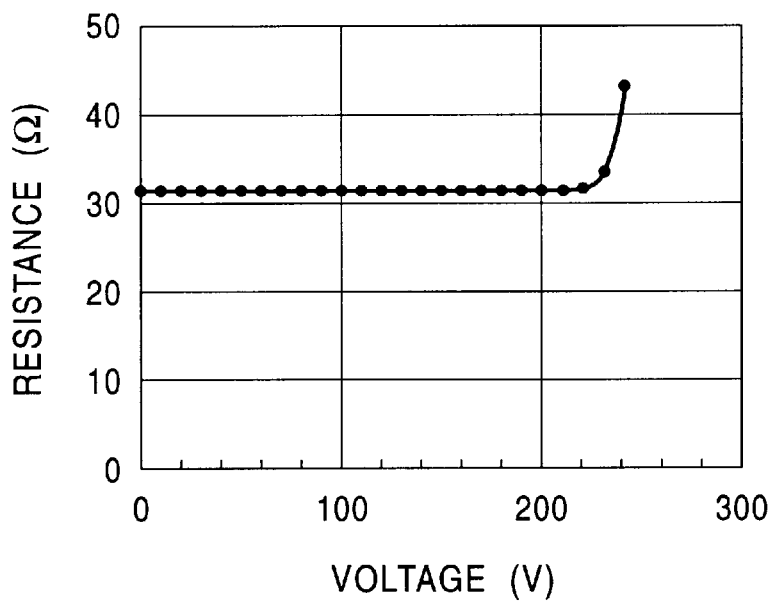
FIGS. 1A and 1B are graphs showing test results of ESD breakdown voltage of an AMR head and a GMR head, respectively.
Figure 1B:
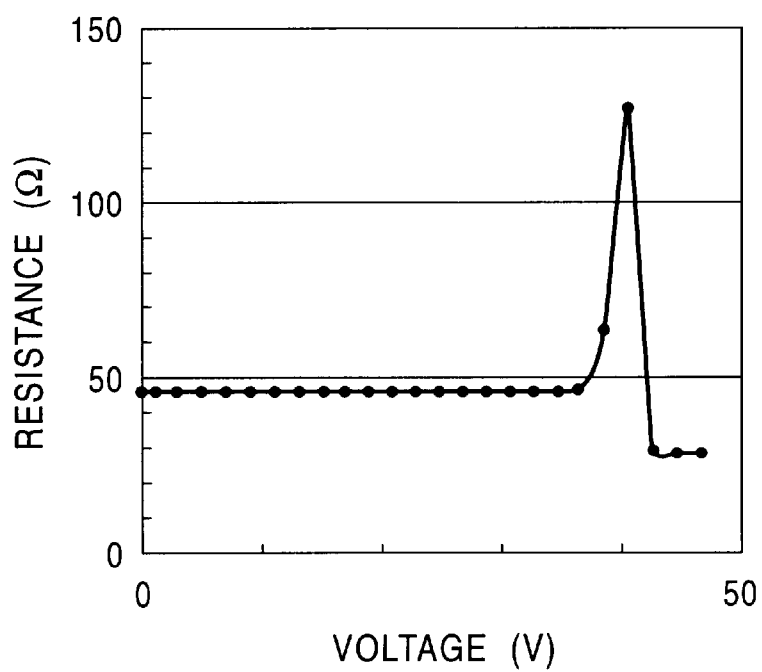
Figure 2:
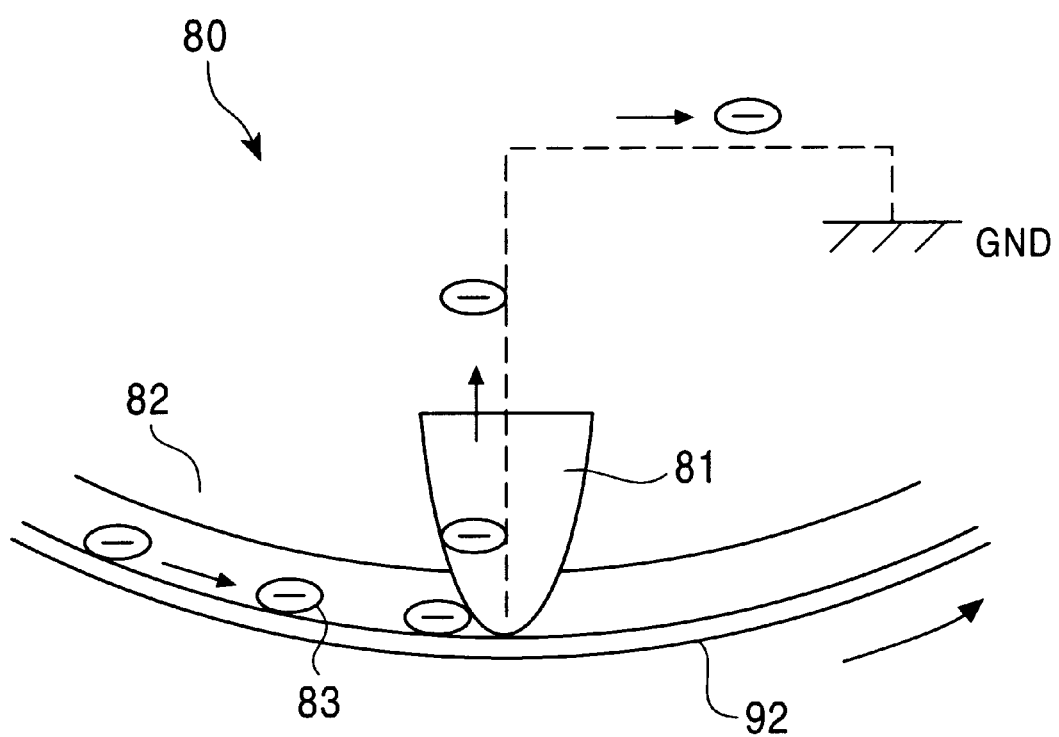
FIG. 2 is a conceptual illustration of a charge flow when a magnetic tape contacts an MR head.

Referring now to the accompanying drawings, a first embodiment of the present invention will be described.

FIG. 3 is a plan view of a magnetic tape drive 10 as a magnetic recording and playback device and a magnetic cassette tape 20 as a magnetic storage medium according to the first embodiment. FIG. 4 is a sectional view of a reel support 15a taken along the line IV—IV indicated in FIG. 3.

The magnetic tape drive 10 comprises, for example, a front panel 17 having a cassette slot through which the magnetic cassette tape 20 is inserted, a chassis 18 disposed at the bottom thereof, an MR head 14a for reading various information stored on a magnetic tape, a recording head (not shown) for writing various information to the magnetic tape, a rotating drum 14 on which the MR head 14a is mounted, reel supports 15a and 15b for supporting reels 24b and 24a, respectively, of the magnetic cassette tape 20 in which the magnetic tape is loaded, and a plurality of guide rollers 16a to 16g for holding the magnetic tape pulled out from the magnetic cassette tape 20 as a magnetic storage medium and also for winding the magnetic tape around the rotating drum 14. The magnetic cassette tape 20 is inserted to the cassette slot (not shown) provided at the front panel 17 in the A direction indicated in the drawing so as to be loaded in the magnetic tape drive 10.

The front panel 17 is formed, e.g., to be flat and has the substantially rectangular cassette slot (not shown). Any material including an insulating material, such as plastic, may be used to form the front panel 17 without a special limitation, as long as the material has a reasonable mechanical strength; however, a conductive material is preferable from the viewpoint of antistatic treatment.

The chassis 18 is formed, e.g., to be flat and disposed at the bottom of the magnetic tape drive 10. Any material including a conductive material, such as stainless steel and other metals, and an insulating material, such as plastic, may be used to form the chassis 18 without a special limitation, as long as the material has a reasonable mechanical strength; however, a conductive material is preferable from the viewpoints of antistatic treatment and connection of the reel supports 15a and 15b to the ground. The connection will be described later. The chassis 18 is preferably connected to the ground from the same viewpoint.

As described above, the MR head 14a utilizing an MR effect of an MR element functions as a playback-only magnetic head for reading signals recorded in the magnetic tape.

The rotating drum 14 is formed, e.g., in a cylindrical shape and has the MR head 14a and a recording head (not shown) both mounted around the rotating drum 14. The cylindrical rotating drum 14 rotates around its own axis together with the MR head 14a and the recording head mounted around the drum 14 so as to read and write information from and to the magnetic tape based on a helical scan principal.

The reel supports 15a and 15b are rotating bodies driven by, e.g., motors so as to rotate the reels 24b and 24a loaded in the magnetic cassette tape 20, thereby allowing the magnetic tape to travel.

As shown in FIG. 4, the reel support 15a comprises, for example, a capstan motor 15aa mounted on the chassis 18, a shaft 15ac driven by the capstan motor 15aa, a rotor 15ab which rotates in accordance with the rotation of the shaft 15ac, and a spring 15ad mounted on the shaft 15ac.

The reel support 15a is provided with a predetermined antistatic treatment and, thereby, suppresses the generation of static electricity on the reel support 15a during the operation of the magnetic cassette tape 20, preventing the ESD breakdown of the MR head 14a mounted on the rotating drum 14 caused by static electricity charged on the reel support 15a.

The reel support 15a is provided with the antistatic treatment, e.g., in such a manner that at least one part of the reel support 15a, preferably the entire reel support 15a, is formed of a conductive material. More particularly, the reel support 15a is provided with the antistatic treatment, e.g., such that the capstan motor 15aa, the rotor 15ab, the shaft 15ac, the spring 15ad, and other members constituting the reel support 15a are formed of conductive materials.

The conductive materials for the capstan motor 15aa, the rotor 15ab, the shaft 15ac, the spring 15ad, and other members constituting the reel support 15a preferably have a surface-resistance, e.g., ranging from 0 $\Omega/inch^2$ to $1\times10^{12}$ $\Omega/inch^2$. In other words, when the surface-resistance of these conductive materials become too large, larger amounts of static electricity are charged on the capstan motor 15aa, the rotor 15ab, the shaft 15a c, the spring 15ad, and other members during the operation of the magnetic cassette tape 20, leading to a larger possibility of the ESD breakdown of the MR head 14a.

Preferable examples of the above-described conductive materials include metals such as stainless steel, a tin oxide doped with antimony, an indium oxide doped with tin, and a zinc oxide doped with aluminum. More specifically, a preferable conductive material is "Toyolac Parrel TP40" made by Toray Industries Inc.

At least one part of the reel support 15a is preferably connected to the ground. With this treatment, static electricity charged on the reel support 15a is discharged to the ground, and thus the generation of static electricity thereon is suppressed, thereby preventing the ESD breakdown of the MR head 14a. The reel support 15a is connected to the ground by having an arrangement in which, e.g., one end of the shaft 15ac is connected to the ground by contacting the conductive chassis 18 that is connected to the ground.

The reel support 15b preferably has the same arrangement as the reel support 15a, so that the reel support 15b is provided with the same antistatic treatment. The tape guide rollers 16a to 16g are rotating bodies formed, e.g., in a cylindrical shape, each rotating around its own axis. Any material may be used to form the tape guide rollers 16a to 16g without a special limitation as long as the material has a reasonable mechanical strength; however, a conductive material, such as metal, is preferable from the viewpoint of antistatic treatment.

Figure 5A:
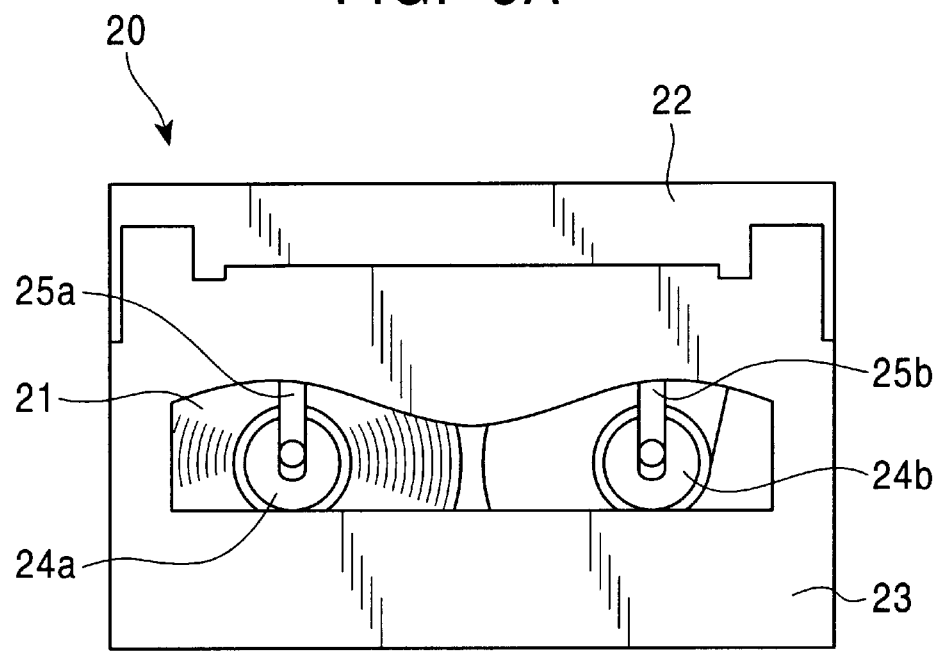
FIGS. 5A and 5B are a plan view and a bottom view, respectively, of the appearance of the magnetic cassette tape as a magnetic storage medium.
Figure 5B:
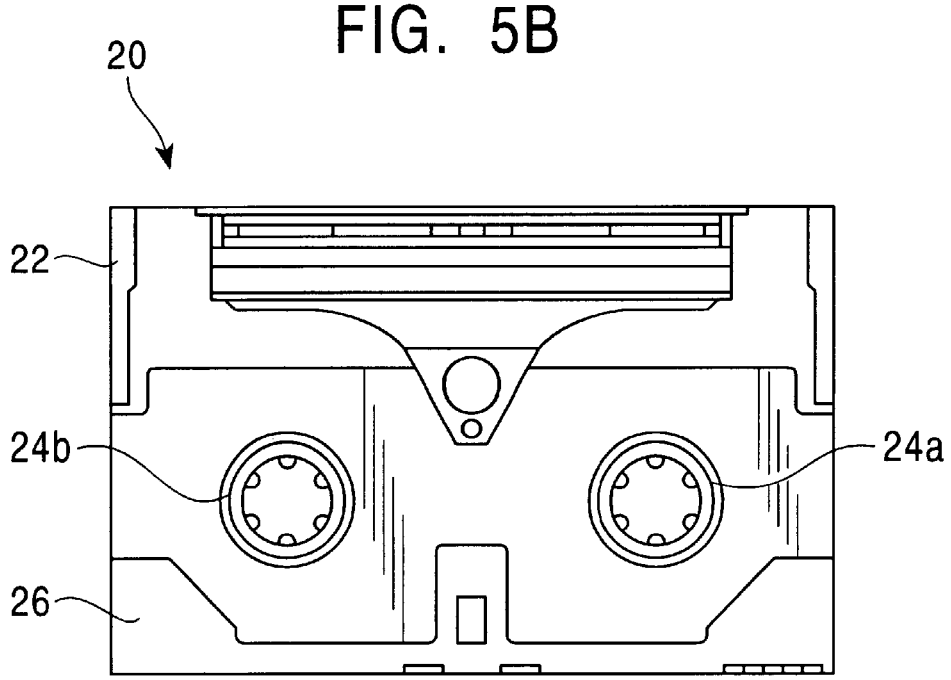

FIGS. 5A and 5B are, respectively, a plan view and a bottom view illustrating an external structure of the magnetic cassette tape 20 as a magnetic storage medium.

As shown in FIGS. 5A and 5B, the magnetic cassette tape 20 comprises a magnetic tape 21 for storing various information that is read by, e.g., the MR head 14a, a pair of reels 24a and 24b around which the magnetic tape 21 is wound, a pair of shaft holders 25a and 25b for holding the shafts of the reels 24a and 24b, respectively, a lid 22, an upper shell 23, and a lower shell 26. The latter three parts constitute a case for housing the magnetic tape 21.

The magnetic tape 21 has a structure in which a ferromagnetic-metal thin film composed of such as Co, Co—Ni, Co—Fe, Co—Cr, Co—Ti, Co—Mo, Co—Ni—O, Co—Ni—P, or Co—Cr—Nb is formed on a polymer film having, e.g., polyethylene naphthalete, polyether ether ketone, polyphenylene sulphide, polyamide, or polyimide. Recording of various information is performed by magnetizing the ferromagnetic-metal thin film.

Any material including an insulating material, such as plastic including polyester, may be used to form the lid 22, the upper shell 23, and the lower shell 26 without a special limitation as long as the material has a reasonable mechanical strength; however, a conductive material is preferable from the viewpoint of antistatic treatment.

Any material may be used to form the shaft holders 25a and 25b without a special limitation as long as the material has a reasonable mechanical strength; however, a conductive material, such as stainless steel, is preferable from the viewpoint of antistatic treatment.

The reels 24a and 24b have, e.g., substantially cylindrical portions around which the magnetic tape 21 is wound. Substantially gear-like structures are provided inside the cylindrical portions so that the respective torque of the reel supports 15a and 15b is effectively transmitted to the reels 24b and 24a.

The reels 24a and 24b are provided with a predetermined antistatic treatment and, thereby, suppress the generation of static electricity on the reels 24a and 24b during the operation of the magnetic cassette tape 20, preventing the ESD breakdown of the MR head 14a mounted on the rotating drum 14 due to static electricity charged on the reel support 15a.

As the antistatic treatment, for example, at least one part of the reels 24a and 24b, preferably the entire part thereof comprises a conductive material.

The conductive material for the reels 24a and 24b preferably has a surface-resistance, e.g., ranging from 0 $\Omega$/inch$^2$ to $1\times10^{12}$ $\Omega$/inch$^2$. In other words, when the surface-resistance of this conductive material becomes too large, larger amounts of static electricity are charged on the reels 24a and 24b, leading to a larger possibility of ESD breakdown of the MR head 14a.

Preferable examples of the above-described conductive material include a metal such as stainless steel, a tin oxide doped with antimony, an indium oxide doped with tin, and a zinc oxide doped with aluminum. More specifically, a preferable conductive material is "Toyolac Parrel TP40" made by Toray Industries Inc.

The reels 24a and 24b are preferably connected to the ground when the magnetic cassette tape 20 is loaded in the magnetic tape drive 10. With this treatment, static electricity charged on the reels 24a and 24b is discharged to the ground, and thus the generation of static electricity on the reels 24a and 24b is suppressed, thereby preventing the ESD breakdown of the MR head 14a.

The connection of the reels 24a and 24b to the ground will now be described in detail.

Figure 6:
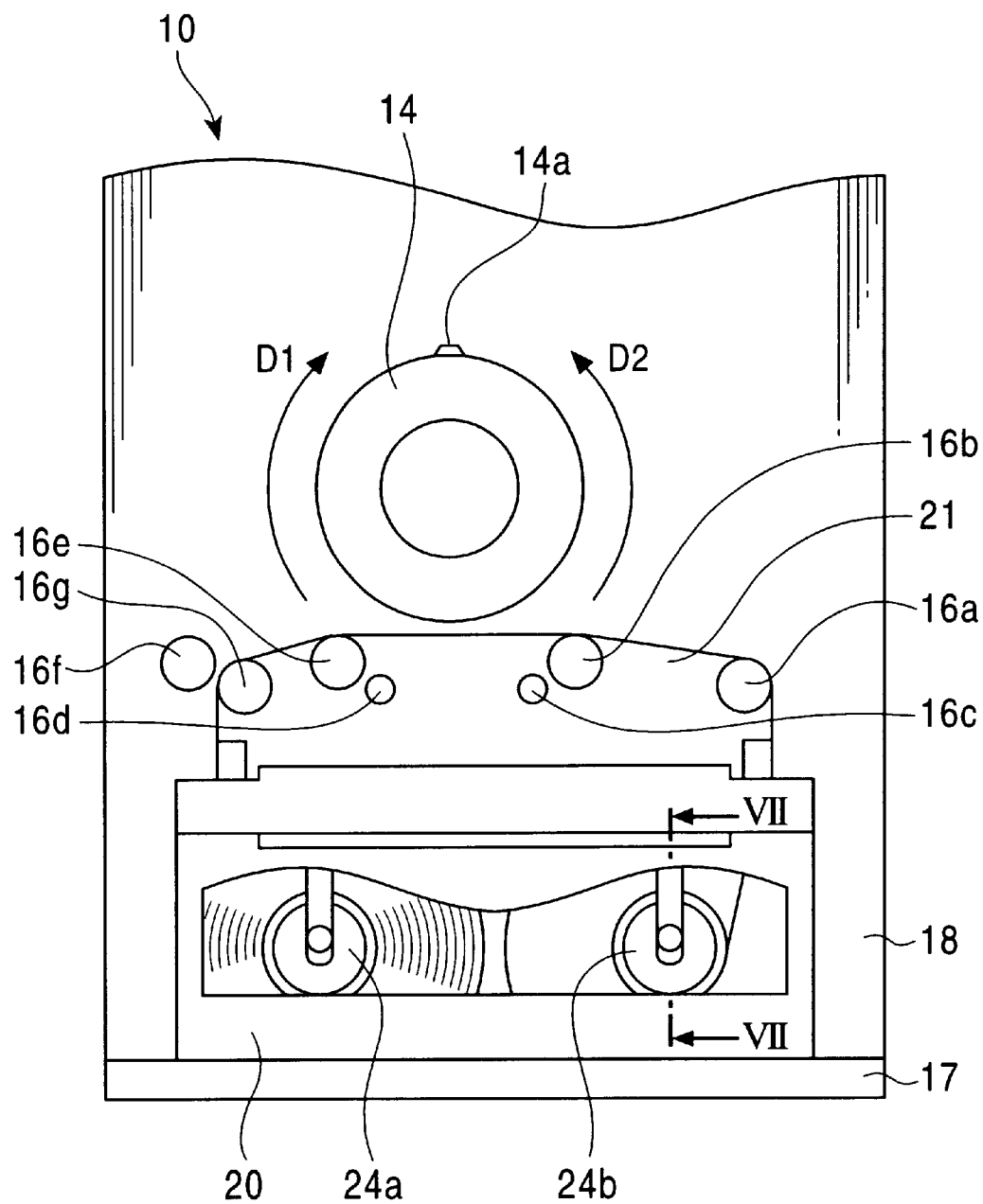
FIG. 6 is a plan view illustrating the inside of the magnetic tape drive in which the magnetic cassette tape is loaded.
Figure 7:
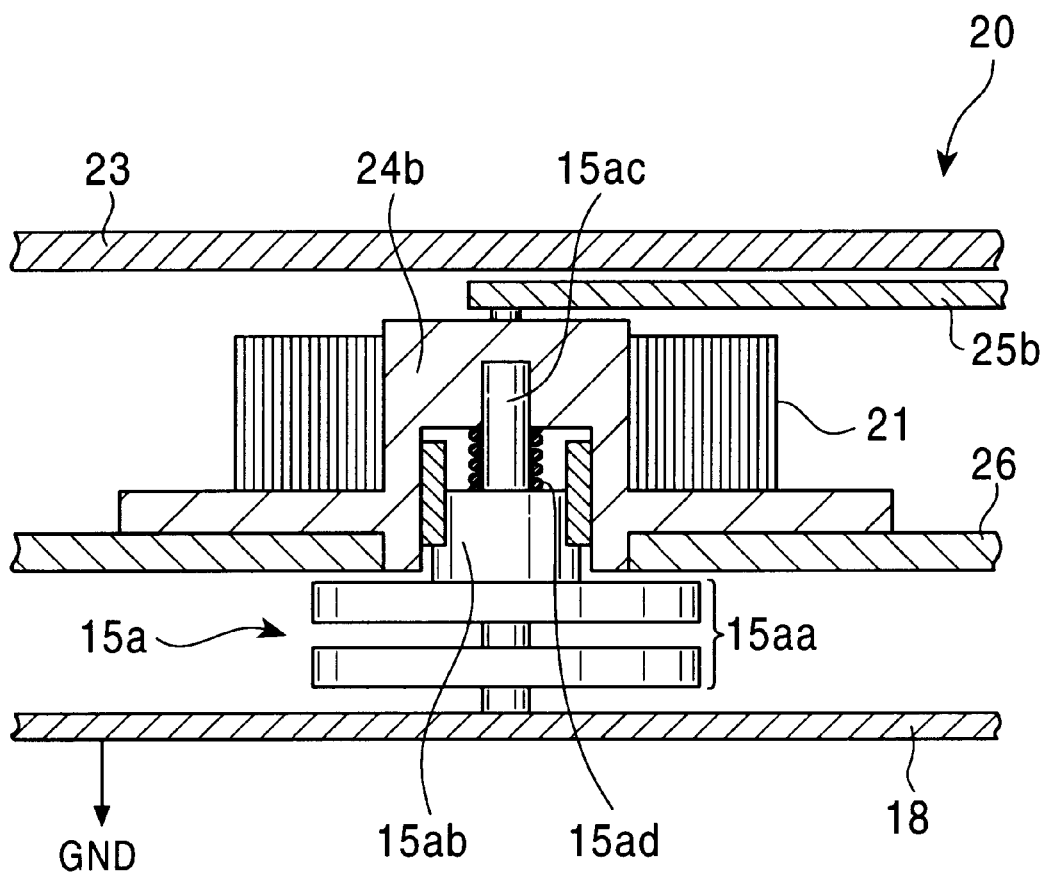
FIG. 7 is a sectional view of a reel and a reel support taken along the line VII—VII indicated in FIG. 6.

FIG. 6 is a plan view illustrating the inside of the magnetic tape drive 10 in which the magnetic cassette tape 20 is loaded. FIG. 7 is a sectional view of the reel 14a and the reel support 15a taken along the line VII—VII indicated in FIG. 6. As shown in FIG. 7, the magnetic cassette tape 20 loaded in the magnetic tape drive 10 is arranged such that the reel support 15a is inserted in the reel 24b, and one end of the shaft 15ac is contacted to the inside of the reel 24b. Forming the shaft 15ac and the chassis 18 with a conductive material and connecting one end of the shaft 15ac to the chassis 18 and the chassis 18 to the ground allows the reel 24b to be connected to the ground through the shaft 15ac and the chassis 18. FIG. 7 illustrates that the reel 24b is connected to the ground through the reel support 15a; likewise, the reel 24a may be connected to the ground through the reel support 15b.

After the magnetic cassette tape 20 is inserted in the magnetic tape drive 10 as shown in FIG. 7, the magnetic tape 21 is wound around the rotating drum 14 in the following manner. As shown in FIG. 6, the tape-guide rollers 16a to 16e and 16g pull the magnetic tape 21 out from the inside of the magnetic cassette tape 20 loaded in the magnetic tape drive 10, hold the pulled-out portion of the magnetic tape 21, and move so as to surround the rotating drum 14 in the D1 and D2 directions indicated in the drawing. The series of these movements of the rollers 16a to 16e and 16g completes the winding of the magnetic tape 21 around the rotating drum 14.

Figure 8:
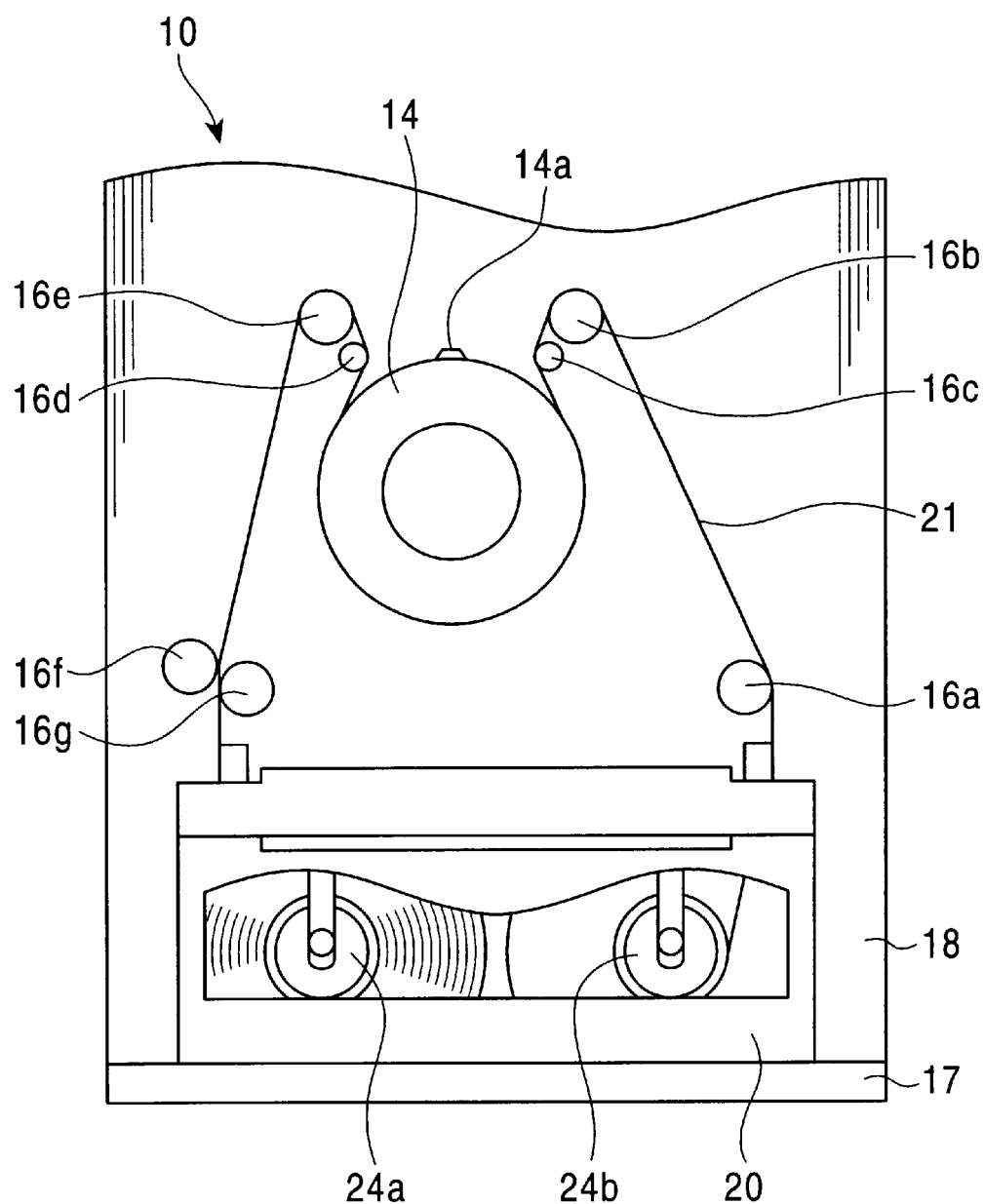
FIG. 8 is a plan view illustrating the inside of the magnetic tape drive in which the magnetic tape is wound around a rotating drum.

FIG. 8 is a plan view illustrating the inside of the magnetic tape drive 10 in which the magnetic tape 21 is wound around the rotating drum 14. The magnetic tape 21 wound around the rotating drum 14 travels in accordance with the rotations of the reels 24a and 24b, which are driven by the reel supports 15b and 15a, respectively. Thus, the recording head and the MR head 14a mounted on the rotating drum 14 read and write various information from and to the magnetic tape 21, respectively.

The reel supports 15a and 15b and the reels 24a and 24b are provided with the foregoing antistatic treatments, thereby suppressing the generation of static electricity on the reel supports 15a and 15b and the reels 24a and 24b when the magnetic tape 21 is wound around the rotating drum 14 or when information is read from or written to the magnetic tape 21. Test results of an exemplary structure of the reels 24a and 24b formed of a conductive material "Toyolac Parrel TP40" made by Toray Industries Incorporation reveal that the absolute values of the electrification voltages across these components measured at a temperature of 27° C. and a humidity of 60% decrease to 20 V or smaller.

By connecting the reel supports 15a and 15b and the reels 24a and 24b to the ground, static electricity charged thereon when the magnetic tape 21 is wound around the rotating drum 14 or when information is read from or written to the magnetic tape 21 is discharged to the ground, and thus the generation of static electricity thereon is suppressed.

According to the first embodiment, as described above, the reels 24a and 24b are provided with a predetermined antistatic treatment, thereby suppressing the generation of static electricity thereon and preventing the ESD breakdown of the MR head 14a.

Further, the reels 24a and 24b are formed of a conductive material as an antistatic treatment, thereby suppressing the generation of static electricity thereon and preventing the ESD breakdown of the MR head 14a.

Further, since the reels 24a and 24b are arranged to connect to the ground when the magnetic cassette tape 20 is loaded in the magnetic tape drive 10, static electricity charged thereon is discharged to the ground, thereby suppressing the generation of static electricity thereon is suppressed, and as a result thereby preventing the ESD breakdown of the MR head 14a.

Further, the reels 24a and 24b are formed of a conductive material having a surface-resistance ranging from 0 $\Omega$/inch to $1\times10^{12}$ $\Omega$/inch$^2$, thereby suppressing the generation of static electricity thereon and preventing the ESD breakdown of the MR head 14a.

Further, the reels 24a and 24b are formed of a metal thereby suppressing the generation of static electricity thereon and preventing the ESD breakdown of the MR head 14a.

Further, the reel supports 15a and 15b for supporting the reels 24b and 24a, respectively, of the magnetic cassette tape 20 loaded in the magnetic tape drive 10 are provided with an antistatic treatment, thereby suppressing the generation of static electricity on the reel supports 15a and 15b and preventing the ESD breakdown of the MR head 14a.

Further, at least one part of the reel supports 15a and 15b is formed of a conductive material as an antistatic treatment, thereby suppressing the generation of static electricity thereon and preventing the ESD breakdown of the MR head 14a.

Further, by connecting at least one part of the reel supports 15a and 15b to the ground, static electricity charged on the reel supports 15a and 15b is discharged to the ground, thus the generation of static electricity thereon is suppressed, and thereby preventing the ESD breakdown of the MR head 14a.

Further, the reel supports 15a and 15b are formed of a conductive material having a surface-resistance ranging from 0 $\Omega/\text{inch}^2$ to $1\times10^{12}$ $\Omega/\text{inch}^2$, thereby suppressing the generation of static electricity thereon and preventing the ESD breakdown of the MR head 14a.

Further, the reel supports 15a and 15b are formed of a metal, thereby, suppressing the generation of static electricity thereon and preventing the ESD breakdown of the MR head 14a.

The present invention is not limited to the first embodiment. Although all of the reel supports 15a and 15b and the reels 24a and 24b in the first embodiment are provided with the antistatic treatments, only some of them may be provided with the antistatic treatments.

Next, a second embodiment of the present invention will be described. The second embodiment is a modification of the first embodiment wherein the difference lies in an antistatic treatment performed on the reel supports 15a and 15b and the reels 24a and 24b. The following description will focus mainly on this difference, and repetitive descriptions will be omitted.

In the second embodiment, antistatic films are formed on at least one portion of the surfaces of the reel supports 15a and 15b and on the surfaces of the reels 24a and 24b, which thereby suppress the generation of static electricity thereon, preventing the ESD breakdown of the MR head 14a.

Material for the antistatic film preferably has a surface-resistance, e.g., ranging from 0 $\Omega/\text{inch}^2$ to $1\times10^{12}$ $\Omega/\text{inch}^2$. The reason for this lies in that, when the surface-resistance of the antistatic films becomes too large, a larger amount of static electricity is charged on the reel supports 15a and 15b and on the surfaces of the reels 24a and 24b, increasing the possibility of the ESD breakdown of the MR head 14a.

Preferable examples of materials constituting the above described antistatic film include metal films, tin oxide doped with antimony, indium oxide doped with tin, and zinc oxide doped with aluminum. Other preferable examples of the antistatic film are the following: an antistatic film composed of a material such as water-soluble conductive polyaniline, water-soluble conductive polypyrrole, water-soluble polythiophene, water-soluble polyparaphenylene, and water-soluble polyparaphenylene vinylene, as disclosed in Japanese Unexamined Utility Model Publication No.6-20040; a conductive resin film having a composition of polyarylate, a conductive filler, and a phenolic antioxidant, as disclosed in Japanese Unexamined Patent Application Publication No. 2000-186218; an antistatic film formed by vacuum depositing a metallic element such as Cr, Cu, Fe, Co, and Ni belonging to the fourth period of the periodic table, as disclosed in Japanese Unexamined Patent Application Publication No. 2000-169685; and an antistatic film formed of (a) a cationic surfactant, e.g., a quaternary ammonium salt, an aliphatic amine or its derivative, a benzimidazole derivative, or an aliphatic amid derivative, (b) an anionic surfactant, e.g., sodium alkylphosphate, alkylphenol polyethylene glycol sulfuric acid sodium salt, or polystyrene sulfonate, and (c) a non-ionic surfactant, e.g., polyoxyethylene aliphatic ether or polyoxyethylene alkyl ether, as disclosed in Japanese Patent No. 2821762.

Test results of an exemplary structure of the reels 24a and 24b having the above described anti-static films formed on the surfaces thereof reveal that the absolute values of the electrification voltages measured across these components decrease to 3 V or smaller at a temperature of 27° C. and a humidity of 60%.

The antistatic films formed on the surfaces of the reels 24a and 24b and the reel supports 15a and 15b are preferably connected to the ground in a similar fashion as in the first embodiment. This allows static electricity charged on the reel supports 15a and 15b and the reels 24a and 24b to be discharged to the ground, and thus the generation of static electricity thereon is suppressed, preventing the ESD breakdown of the MR head 14a.

According to the second embodiment, as described above, the antistatic films are formed on the surfaces of the reels 24a and 24b as an antistatic treatment, thereby suppressing the generation of static electricity thereon and preventing the ESD breakdown of the MR head 14a.

Further, since the antistatic films formed on the reels 24a and 24b are arranged to connect to the ground when the magnetic cassette tape 20 is loaded in the magnetic tape drive 10, static electricity charged on the reels 24a and 24b is discharged to the ground, thus suppressing the generation of static electricity thereon and preventing the ESD breakdown of the MR head 14a.

Further, the reels 24a and 24b comprise a conductive material formed on the surfaces thereof having a surface-resistance ranging from 0 $\Omega/\text{inch}^2$ to $1\times10^{12}$ $\Omega/\text{inch}^2$, thereby suppressing the generation of static electricity thereon and preventing the ESD breakdown of the MR head 14a.

Further, the reels 24a and 24b have metal films formed on the surfaces thereof, thereby suppressing the generation of static electricity thereon and preventing the ESD breakdown of the MR head 14a.

Further, at least one part of each of the reel supports 15a and 15b has a conductive material formed on the surface thereof as an antistatic treatment of the reel supports 15a and 15b, thereby suppressing the generation of static electricity thereon and preventing the ESD breakdown of the MR head 14a.

Further, by connecting the antistatic film formed on the surface of at least one part of each of the reel supports 15a and 15b to the ground, static electricity charged on the reel supports 15a and 15b is discharged to the ground, thus suppressing the generation of static electricity thereon and preventing the ESD breakdown of the MR head 14a.

Further, at least one part of each of the reel supports 15a and 15b has an antistatic film having a surface-resistance ranging from 0 $\Omega/\text{inch}^2$ to $1\times10^{12}$ $\Omega/\text{inch}^2$ formed on the surface thereof, thereby suppressing the generation of static electricity on the reel supports 15a and 15b and preventing the ESD breakdown of the MR head 14a.

Further, the reel supports 15a and 15b have metal films formed on the surfaces thereof, thereby suppressing the generation of static electricity thereon and preventing the ESD breakdown of the MR head 14a.

The present invention is not limited to the second embodiment. For example, antistatic films are formed on the surfaces of all of the reel supports 15a and 15b and the reels 24a and 24b as an antistatic treatment in the second embodiment; however, a part of them may be provided with the antistatic treatment according to the second embodiment, and another part of them may be provided with that according to the first embodiment.

Figure 9:
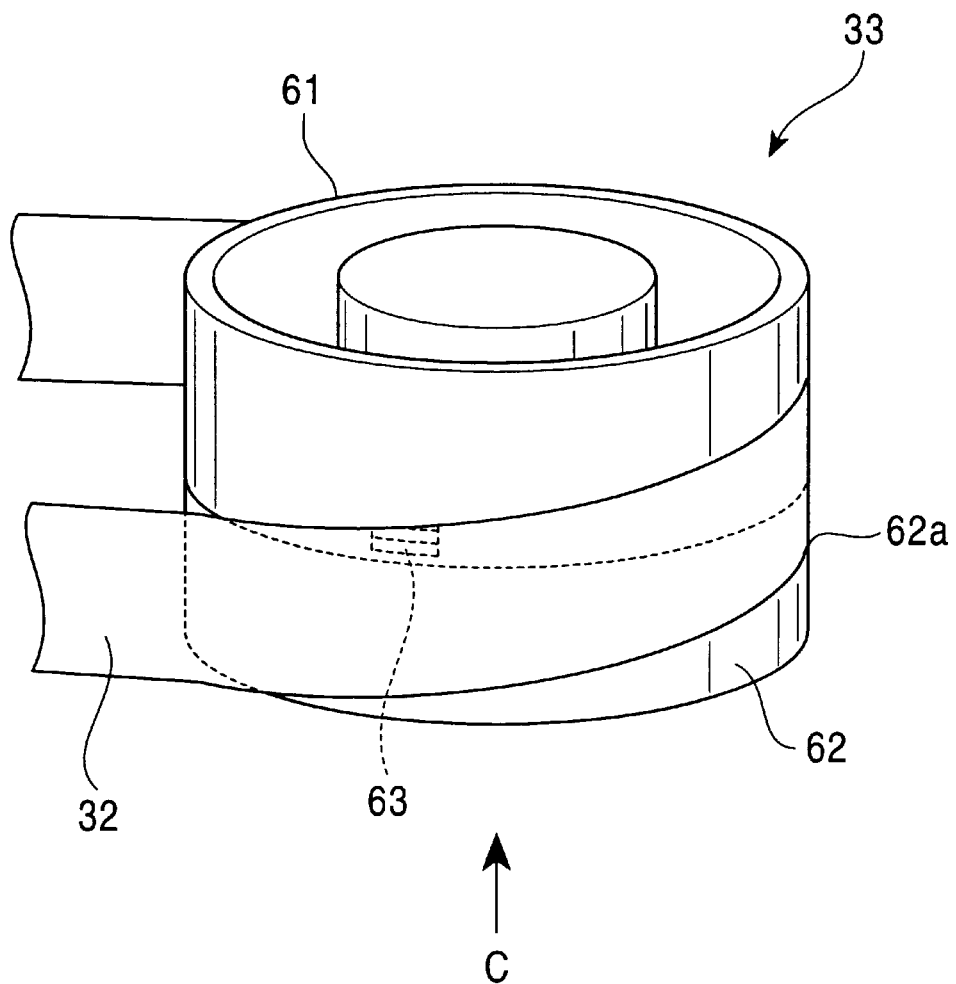
FIG. 9 is a perspective view illustrating a schematic structure of a head drum of the magnetic tape drive according to a third embodiment of the present invention.

Referring now to FIGS. 9 to 13, a third embodiment of the present invention relating to a head drum as a part of the magnetic recording and playback device will be described. FIG. 9 is a perspective view illustrating the schematic structure of the head drum 33. The head drum 33 is formed in a cylindrical shape generally having a smooth outer surface and comprises an upper rotating drum 61 and a lower fixed drum 62 fixed in a coaxial manner with the rotating drum 61. The fixed drum 62 has a lead 62a on the outer surface thereof for guiding the traveling magnetic tape 32 so that the magnetic tape 32 travels around the head drum 33 in a helical manner. The rotating drum 61 comprises a reading head 63 for detecting signals stored in the magnetic tape 32 and a recording head (not shown) for writing information to the magnetic tape 32. The reading head 63 is an MR head using an MR element as a head element and is mounted on the outer surface of the rotating drum 61 such that it projects slightly so as to come into contact with the magnetic tape 32. Thus, the rotation of the rotating drum 61 allows the reading head 63 to scan the magnetic tape 32 at an angle and read signals stored therein by detecting variations of the resistance of the MR element in accordance with the corresponding recorded signals. The recording head is a so-called inductive-type magnetic head, for example, constructed such that a coil is wound around a magnetic core having a magnetic gap. Although the rotating drum 61 generally has pluralities of reading heads 63 and recording heads mounted thereon, FIG. 9 illustrates only one of the reading heads 63.

Figure 10:
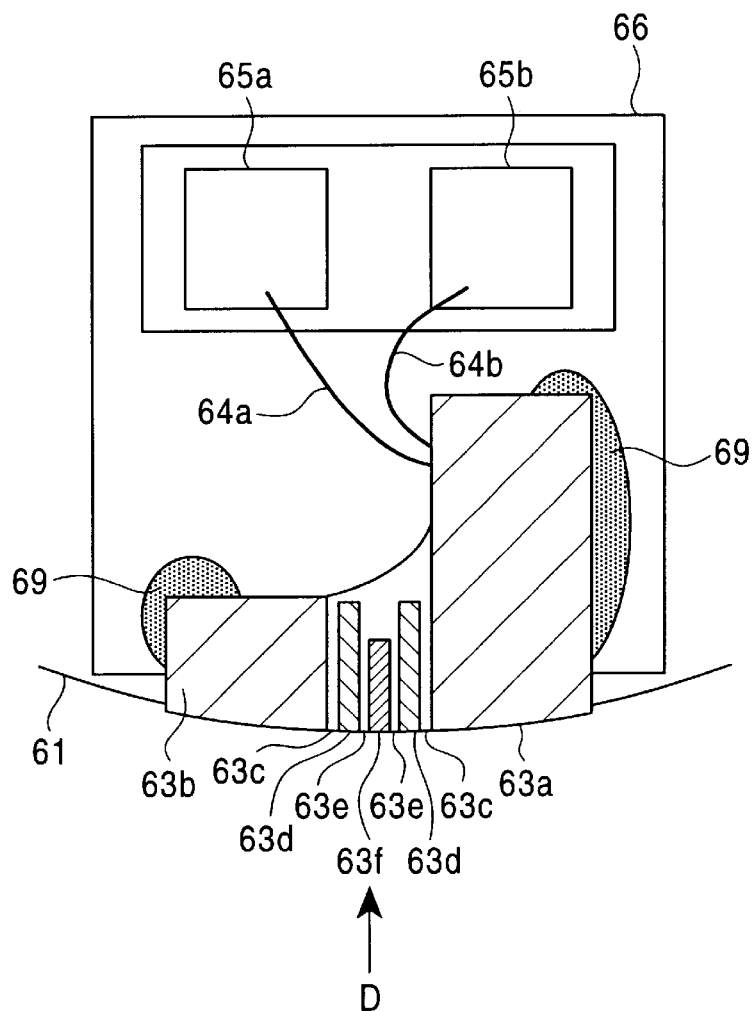
FIGS. 10 and 11 are a bottom view and a side view, respectively illustrating the structure of a reading head according to the third embodiment of the present invention.
Figure 11:
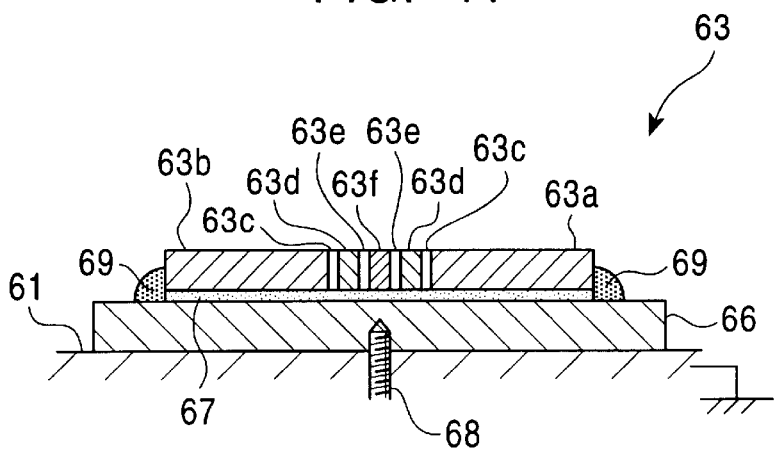

FIGS. 10 and 11 are a bottom view and a side view of the reading head 63. FIG. 10 is an illustration of the mounting structure of the reading head 63 viewed in the direction of the arrow C indicated in FIG. 9, that is, viewed from the bottom of the head drum 33. FIG. 11 is an illustration of the reading head 63 viewed in the direction of the arrow D indicated in FIG. 10. With reference to FIGS. 10 and 11, the structure of the reading head 63 will be described.

The reading head 63 comprises the following components: a conductive head substrate 63a and a conductive protection substrate 63b; a pair of outer insulating films 63c disposed between the head substrate 63a and the protection substrate 63b; a pair of shielding films 63d composed of soft magnetic material and disposed between the pair of outer insulating films 63c; a pair of inner insulating films 63e disposed between the pair of shielding films 63d; and an MR element 63f disposed between the inner insulating films 63e.

The reading head 63 is connected to terminals 65a and 65b via wires 64a and 64b, respectively, so as to be in connection to a power source. As shown in FIG. 11, the reading head 63 also is bonded to a conductive metal base 66 with an adhesive 67. The metal base 66 is fixed to the rotating drum 61 with a conductive fastening screw 68.

Although the MR element 63f is shown in an enlarged scale in FIGS. 10 and 11 for easy understanding of the structure of the reading head 63, the actual MR element 63f is much smaller than the head substrate 63a and the protection substrate 63b.

The reading head 63 has a structure in which the pair of shielding films 63d constitute a pair of magnetic shielding members and the MR element 63f is disposed in the shielded space between the pair of magnetic shielding members. This structure serves to improve the frequency response and the resolution of the reading head 63. The shield films 63d made of, e.g., permalloy plated films and the pairs of insulating films 63c and 63e composed of, e.g., $Al_2O_3$ are deposited on the head substrate 63a, and the protection substrate 63b is bonded thereon to complete the reading head 63. The end surface of the reading head 63, facing outward (i.e., downward in the drawing of FIG. 10) at the outer surface of the rotating drum 61, is polished as a sliding surface with the magnetic tape 32.

As described above, the head substrate 63a and the protection substrate 63b are formed of a conductive material. Specifically, the conductive material is selected as the one free from static electricity and having a resistance of $1\times10^{10}\Omega$ or less, for example, $Al_2O_3$—TiC having a resistivity of $3\times10^{-3}$ $\Omega$/cm or MnZn. The head substrate 63a and the protection substrate 63b are electrically connected to the metal base 66 with, for example, a conductive paste 69 in addition to the epoxy adhesive 67 or the like. A preferable example of the conductive paste 69 is a silver paste. The metal base 66 is formed of, e.g., brass and is fixed such that it is electrically connected to the rotating drum 61 with the fastening screw 68 made of a conductive metal. The rotating drum 61 is formed of, e.g., aluminum so as to be conductive at the ground potential.

Figure 12:
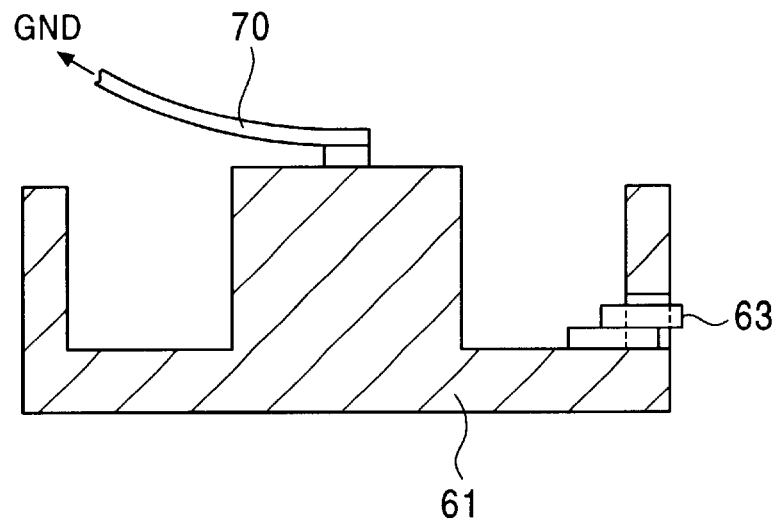
FIG. 12 is a sectional view of the rotating drum.

FIG. 12 is a sectional view of the rotating drum 61. The rotating drum 61 is connected to a spring 70 therein as shown in FIG. 12. The spring 70 is in contact with a chassis (not shown) functioning as the ground of the reading and playback device, allowing the rotating drum 61 to be at the ground potential. Thus, the head substrate 63a and the protection substrate 63b are electrically connected to the rotating drum 61 at the ground potential through the metal base 66.

As described above, the cassette case for winding and housing the magnetic tape 32 is typically formed of a low-resistance synthetic resin. The cassette cases of this type easily charge static electricity, for example, by friction with the packing material or a glove both including synthetic fibers during handling, or by friction with a component of the reading and playback device when loaded in the device. When the magnetic tape 32 housed in the cassette case charged as described above comes into contact with the reading head 63, electric charges start to flow to the ground of the device through the magnetic tape 32 and the MR element 63f, causing the ESD breakdown of the MR element 63f.

To prevent this, in the head drum 33 according to the present invention, the head substrate 63a and the protection substrate 63b are formed of a conductive material so as to be electrically connected to the ground of the device through the conductive paste 69, the metal base 66, and the fastening screw 68 for fastening the metal base 66 and the rotating drum 61. This connection provides a flow of electrostatic charges without flowing to the MR element 63f when the magnetic tape 32 comes into contact with the reading head 63.

Figure 13:
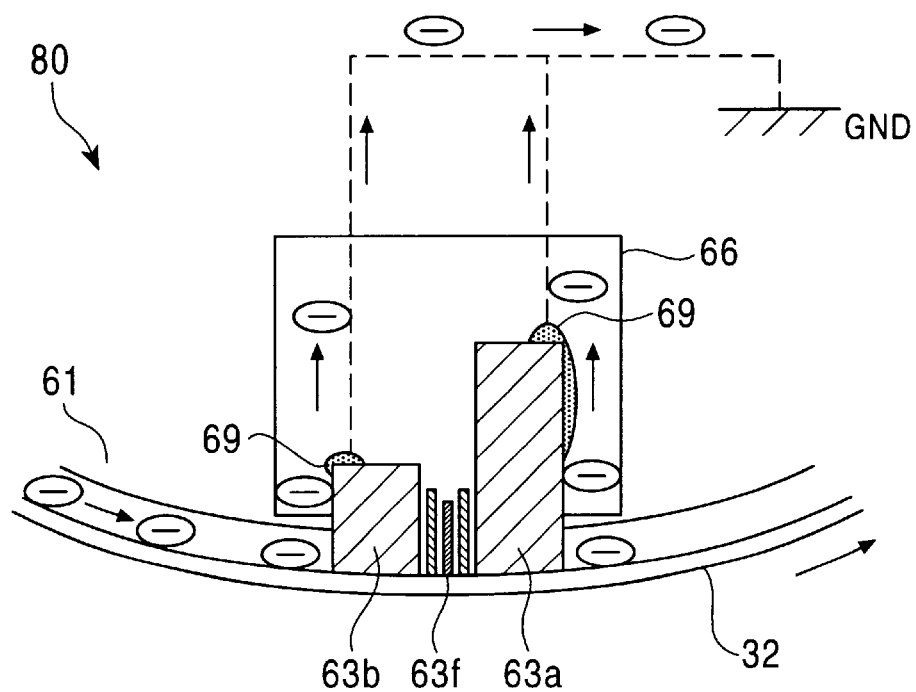
FIG. 13 is a conceptual illustration of a charge flow in the head drum according to the third embodiment of the present invention.

FIG. 13 is a conceptual illustration of a flow of electrostatic charges in the head drum 33. When the magnetic tape 32 in the magnetic reading and playback device is used for playback mode, first the cassette case is inserted in the device, next the rotating drum 61 starts to rotate, and subsequently the magnetic tape 32 is moved close to the rotating drum 61 and then is wound around the drum 61 by a guide mechanism of the device so as to complete the loading of the magnetic tape 32. When the magnetic tape 32 comes into contact with the reading head 63, static electricity charged on the cassette case flows to the ground of the electrically connected chassis or the like via the surface of the magnetic tape 32, the head substrate 63a, and the protection substrate 63b in that order, without passing though the MR element 63f as shown in FIG. 13. Since the area of the MR element 63f for sliding with the magnetic tape 32 is much smaller than the head substrate 63a or the protection substrate 63b, the magnetic tape 32 also comes into contact with the head substrate 63a or the protection substrate 63b when the magnetic tape 32 comes into contact with the reading head 63 without failing to discharge the static electricity to the head substrate 63b and the protection substrate 63c, thereby preventing most of the static electricity from flowing to the MR element 63f. This prevents the ESD breakdown of the MR element 63f when the cassette case is charged, thereby assuring normal reading operation of the magnetic tape 32.

Although the head substrate 63a and the protection substrate 63b of the reading head 63 are both formed of a conductive material in this embodiment, either one of them many be formed of a conductive material having a resistance of $1\times10^{10}\Omega$ or less.

Further, in the above description, though the magnetic reading and playback device using a magnetic tape has the head drum according to the embodiment of the present invention, the present invention is applicable to a playback device used only for reading a magnetic tape.

What is claimed is:

1. A head drum for reading and writing information from and to a magnetic tape, the head drum comprising:
   a conductive rotating drum at ground potential, the magnetic tape being wound in a helical manner around the rotating drum;
   a metal base fixed inside the rotating drum and electrically connected to the rotating drum; and
   a magnetic head fixed to the metal base, the magnetic head comprising:
      a head substrate and a protection substrate, both having a resistance of $1\times10^{10}\Omega$ or less and electrically connected to the metal base;
      a pair of outer insulating films disposed between the head substrate and the protection substrate; and
      a pair of magnetic shielding films disposed between the pair of outer insulating films;
      a pair of inner insulating films disposed between the pair of magnetic shielding films; and
      a magneto-resistive (MR) head element, disposed between the pair of inner insulating films, for reading stored signals by contacting the magnetic tape, so that said magneto-resistive (MR) head element is protected against an electrostatic discharge (ESD) breakdown voltage.

2. The head drum according to claim 1, wherein the head substrate and the protection substrate comprise one of $Al_2O_3$—TiC and MnZn ferrite.

3. The head drum according to claim 1, wherein the head substrate and the protection substrate are electrically connected to the metal base with a conductive paste.

4. The head drum according to claim 1, wherein either one of the head substrate and the protection substrate has a resistance of $1\times10^{10}\Omega$ or less and is electrically connected to the metal base.

5. A magnetic recording and playback device for recording and reading signals by using a magnetic tape, the magnetic recording and playback device comprising a head drum, the head drum comprising:
   a conductive rotating drum at ground potential, the magnetic tape being wound in a helical manner around the rotating drum;
   a metal base fixed inside the rotating drum and electrically connected to the rotating drum; and
   a magnetic head fixed to the metal base, the magnetic head comprising:
      a head substrate and a protection substrate, both having a resistance of $1\times10^{10}\Omega$ or less and electrically connected to the metal base;
      a pair of outer insulating films disposed between the head substrate and the protection substrate; and
      a pair of magnetic shielding films disposed between the pair of outer insulating films;
      a pair of inner insulating films disposed between the pair of magnetic shielding films; and
      a magneto-resistive (MR) head element, disposed between the pair of inner insulating films, for reading stored signals by contacting the magnetic tape, so that said magneto-resistive (MR) head element is protected from an electrostatic discharge (ESD) breakdown voltage.

* * * * *